E. A. HANFF.
MOTOR CONTROL SYSTEM.
APPLICATION FILED JUNE 11, 1915.
1,367,137.
Patented Feb. 1, 1921.
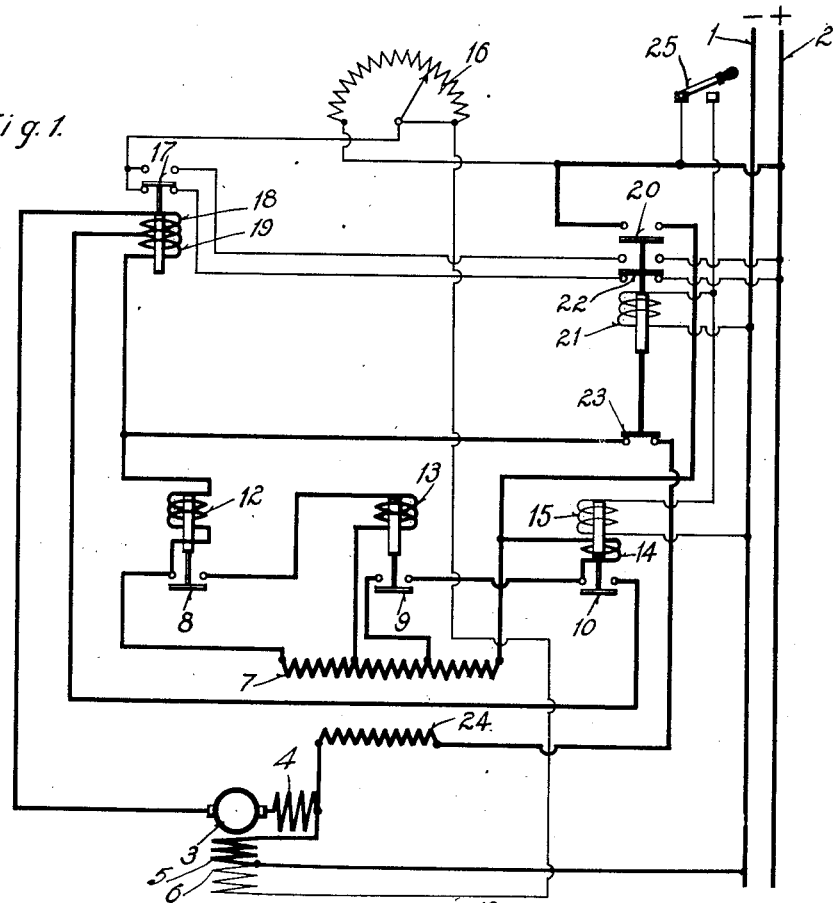
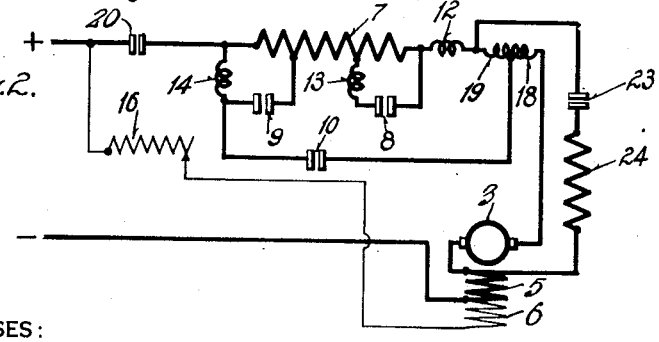
WITNESSES:
R. J. Fitzgerald
Fred H. Miller
INVENTOR
Edward A. Hanff.
BY
Wesley G. Carr
ATTORNEY

UNITED STATES PATENT OFFICE.

EDWARD A. HANFF, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,367,137.  Specification of Letters Patent.  Patented Feb. 1, 1921.

Application filed June 11, 1915. Serial No. 33,527.

*To all whom it may concern:*

Be it known that I, EDWARD A. HANFF, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and particularly to such systems as embody dynamic braking means for bringing electric motors quickly and safely to rest.

My invention has for its object to provide a system of the above indicated character having means for regulating the current traversing the motor circuit to different predetermined values, according as the motor is being accelerated or retarded.

In the operation of shunt-wound and compound-wound electric motors, it is customary to control their speeds by varying the resistance in series with the shunt field winding. When a fixed dynamic braking resistor is employed and the field rheostat has a fixed adjustment during dynamic braking, it is desirable to change the value at which the curent-regulating means is adjusted to operate for the respective operations. Otherwise, the braking effect will be either excessive or insufficient, according to the adjustment of the rheostat to give a relatively strong, or a relatively weak, field.

According to the present invention, I employ a current-limiting device comprising an electromagnetic switch having a two-part coil, one part of which is short circuited during acceleration of the motor by weakening its magnetic field and during normal operation of the motor. During the operation of dynamic braking, the entire coil is in circuit, thus rendering the device operable at a lower current value. This arrangement is especially desirable because of the tendency of electric motors to commutate poorly when acting as generators under heavy loads.

In the accompanying drawing, Figure 1 is a diagrammatic view of circuits and apparatus embodying my invention. Fig. 2 is a diagrammatic view of a schematic arrangement of the system of Fig. 1.

Line conductors 1 and 2, which may be connected to any suitable source of direct current, supply energy to an electric motor having an armature 3, a commutating field winding 4, a series field winding 5 and a shunt field winding 6. A sectional starting resistor 7 is controlled by a series of electromagnetic switches 8, 9 and 10 which are respectively provided with series actuating coils 12, 13 and 14. The switch 10 is provided with a shunt holding coil which does not exert sufficient force to close the switch but holds the latter closed when this action has been effected by the series coil 14.

An adjustable resistor 16 is in series with the shunt field winding 6. The rates at which the motor is accelerated and retarded are controlled by a current-limiting switch 17 having coils 18 and 19 which may be continuous and provided with an intermediate tap, as shown, or they may be arranged in any other suitable manner. The motor circuit is controlled by a main switch 20 having a shunt coil 21. A switch member 22, which is mechanically connected to the switch 20, controls the effect of the operation of the switch 17. A switch 23, which is also connected to the main switch 20, controls a dynamic braking circuit for the motor comprising a resistor 24.

It may be assumed that the several switches are in their respective illustrated positions. To start the motor, a control switch 25 is closed to energize the coil 21 of the main switch 20. The motor circuit, which is thus established, extends from the positive line conductor through switch 20, resistor 7, coil 12, coils 19 and 18, armature 3, commutating field winding 4 and series field winding 5 to negative line conductor 1. The shunt field winding 6 is also energized by a circuit extending from the positive line conductor 2 through the effective portion of the resistor 16 and shunt field winding 6 to negative line conductor 1.

The coils 18 and 19 are energized by the circuit first described to insure that the switch 17 will be in its upper position to short circuit the resistor 16 and thereby insure a strong field during acceleration of the motor by cutting out the starting resistance. The coil 12 is energized to close the switch 8 and thereby complete a shunt circuit for a section of the starting resistor 7. This shunt circuit comprises the coil 13 which is energized to close switch 9 to shunt a second section of the resistor 7. The closing of switch 9 establishes a circuit for the coil 14, and the switch 10 closes to short circuit the entire resistor 7 and the coil 19 of switch 17.

The switch 17 is now controlled solely by the coil 18, and a heavier current is, therefore, required to actuate the switch 17 to its upper position. The switch 17 remains in its lower position unless the current through the coil 18 reaches an abnormal value. When the switch 17 is in its lower position, the resistor 16 is in series with the shunt field winding 6, and the motor is further accelerated by the resultant weakening of its magnetic field. The switch 17 operates in the manner of the well known fluttering relay to shunt the resistor 16 and thereby strengthen the magnetic field when the current in the main motor circuit exceeds a predetermined value. The motor is thus brought quickly and automatically to its normal operating speed.

To stop the motor, the control switch 25 is opened to deënergize coils 21 and 15 which respectively maintain the main switch 20 and the accelerating switch 10 in their closed positions. The switch 20 then opens, and the switch 23 automatically establishes a dynamic braking circuit for the motor which extends from the motor armature through coils 18 and 19, switch 23, dynamic braking resistor 24, and commutating field winding 4 to the other terminal of the motor armature.

The switch member 22, which is in its lower position, operates to reverse the function of the switch 17 in that it causes the latter to short circuit the resistor 16 when it is in its lower position. The coils 18 and 19 now assist each other to maintain the switch 17 in its upper position when the current traversing the dynamic braking circuit exceeds a predetermined value which is less than the maximum value permitted during the acceleration of the motor when the coil 18 alone is in circuit.

When the current in the dynamic braking circuit falls below the predetermined value, the switch 17 will close to short circuit the resistor 16, and the armature 3, which operates as a generator, will supply an increased current to the dynamic braking circuit. The oscillation of the switch 17 will continue until the speed of the armature 3 has decreased to such a rate that the current traversing the dynamic braking circuit has permanently fallen below the predetermined value. Under these conditions, the maximum current traversing the dynamic braking circuit is less than that permitted during acceleration of the motor by weakening its field or during the normal operation of the motor because of the different current value at which the switch 17 operates when the coils 18 and 19 are connected in series.

I provide a simple means whereby the current traversing the dynamic braking circuit is automatically limited to a value that is less than that employed during final acceleration of the motor and is less than the normal full-load value. This arrangement insures that the current traversing the dynamic braking circuit will not be of such value that it cannot be commutated satisfactorily.

It will be understood that, if it is so desired, the switches 20 and 23 may be operated by separate means. It will be understood, also, that the current value at which the coils 18 and 19 operate when connected in series, as compared with the predetermined value at which the coil 18 alone operates the switch 17, may be arranged by properly proportioning the number of turns in the respective coils.

I claim as my invention:

1. In a motor-control system, the combination with an electric motor having a field-magnet winding and a resistor in series therewith, of a current-limiting device for controlling said resistor during acceleration and retardation of said motor, and means for controlling the value at which said device operates, according as the circuits of said motor are arranged to increase or decrease its speed.

2. In a motor-control system, the combination with an electric motor having a field-magnet winding and a resistor in series therewith, of a current-limiting device for controlling said resistor, and means for arranging said device to operate at a different predetermined value when the motor is being retarded by dynamic braking than when it is being accelerated.

3. In a motor-control system, the combination with an electric motor having a field-magnet winding and a resistor in series therewith, of a current-limiting device for controlling said resistor, said device comprising a plurality of actuating coils, and means for short-circuiting one of said coils when the motor is being accelerated and for connecting said one coil in circuit during the dynamic braking of the motor.

4. In a motor-control system, the combination with an electric motor having a field-magnet winding and a resistor in series therewith, of a current-limiting device for controlling said resistor, said device comprising a plurality of actuating coils, means for establishing a dynamic braking circuit including the motor armature and said actuating coils, and means for short circuiting one of said coils during acceleration of said motor.

5. In a motor-control system, the combination with an electric motor, and means for automatically establishing a dynamic braking circuit therefor upon the opening of its normal circuit, of means for automatically controlling the rate at which said motor is accelerated and the rate at which said motor is retarded during dynamic braking, and means controlled by said establishing means for controlling said controlling means.

6. In a motor-control system, the combination with an electric motor, and means comprising a current-limiting device for controlling the rates at which said motor is accelerated and retarded, of means for varying the predetermined value at which said device operates, and means for reversing the effect of the operation of said device.

7. In a motor-control system, the combination with an electric motor, and means comprising a current-limiting device for automatically accelerating said motor, of means for simultaneously establishing a dynamic braking circuit for said motor and varying the predetermined value at which the current-limiting device operates.

8. In a motor-control system, the combination with an electric motor, and means comprising a current-limiting device for automatically accelerating said motor, of means for simultaneously establishing a dynamic braking circuit for said motor and reversing the effect of the operation of said current-limiting device.

9. In a motor-control system, the combination with an electric motor, and means comprising a current-limiting device for automatically accelerating said motor, of means for simultaneously reversing the effect of the operation of said current-limiting device and varying the predetermined value at which it operates.

10. In a motor-control system, the combination with an electric motor and automatic means for controlling the field excitation of said motor, of means for adjusting the conditions under which said controlling means operates according as the circuits of the motor are arranged for acceleration or retardation.

11. In a motor-control system, the combination with an electric motor and automatic means for controlling the field excitation of said motor, of means for adjusting the conditions under which said controlling means operates according as the circuits of the motor are arranged for acceleration or dynamic braking.

12. In a motor-control system, the combination with an electric motor having armature and field-magnet windings, and a resistor in series with said field magnet winding, of a current-limiting device in series with said armature winding for controlling said resistor, and means for controlling the value at which said device operates, according as the motor is being accelerated or retarded.

13. In a motor-control system, the combination with an electric motor having a resistor, of a current-limiting device for controlling said resistor, and means for automatically controlling the value at which said device operates, according as the circuits of the motor are arranged for acceleration or retardation.

14. The combination with an electric motor having a field-magnet winding, a resistor in circuit therewith, a switch for closing the circuit of said motor, and a two-position switch for short-circuiting said resistor, of means mechanically connected to said circuit-closing switch for rendering said short-circuiting switch effective in one of its positions during the normal operation of said motor and for rendering said controlling switch effective in its other position during the dynamic braking of said motor.

15. The combination with an electric motor, of means for controlling said motor having a pair of actuating coils, and means for short-circuiting one of said coils during the acceleration of said motor and for reinserting said coil into circuit during the dynamic braking of said motor.

In testimony whereof, I have hereunto subscribed my name this 27th day of May, 1915.

EDWARD A. HANFF.